United States Patent
Jeter et al.

(10) Patent No.: US 10,515,028 B2
(45) Date of Patent: Dec. 24, 2019

(54) REFERENCE VOLTAGE CALIBRATION USING A QUALIFIED WEIGHTED AVERAGE

(71) Applicant: Apple Inc., Cupertino, CA (US)

(72) Inventors: Robert E. Jeter, Santa Clara, CA (US); Brijesh Tripathi, Los Altos, CA (US); Kiran Kattel, San Francisco, CA (US); Rakesh L. Notani, Sunnyvale, CA (US); Fabien S. Faure, Santa Clara, CA (US); Sukalpa Biswas, Fremont, CA (US); Kai Lun Hsiung, Fremont, CA (US); Neeraj Parik, San Jose, CA (US); Venkata Ramana Malladi, Santa Clara, CA (US); Shiva Kumar, Mountain View, CA (US); Chaitanya Polapragada, Fremont, CA (US); Allen Kim, Belmont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/030,794

(22) Filed: Jul. 9, 2018

(65) Prior Publication Data

US 2019/0042492 A1   Feb. 7, 2019

Related U.S. Application Data

(63) Continuation of application No. 14/676,174, filed on Apr. 1, 2015, now Pat. No. 10,019,387.

(51) Int. Cl.
*G06F 13/16* (2006.01)

(52) U.S. Cl.
CPC ...... *G06F 13/1668* (2013.01); *G06F 13/1689* (2013.01); *Y02D 10/14* (2018.01)

(58) Field of Classification Search
CPC .................. G06F 13/1689; G06F 13/1668
See application file for complete search history.

(56) References Cited

U.S. PATENT DOCUMENTS

| | | | |
|---|---|---|---|
| 7,036,053 B2 | 4/2006 | Zumkehr et al. | |
| 7,162,376 B2 | 1/2007 | Oh et al. | |
| 7,230,449 B2 | 6/2007 | Dreps et al. | |
| 7,703,063 B2 | 4/2010 | Hovis et al. | |
| 2003/0195714 A1 | 10/2003 | Jeddeloh | |
| 2004/0041578 A1 | 3/2004 | Baker | |
| 2014/0059327 A1 | 2/2014 | Berry, Jr. et al. | |
| 2014/0181429 A1 | 6/2014 | Malladi et al. | |
| 2016/0035411 A1* | 2/2016 | Yu .................. | G11C 11/4091 365/189.07 |

* cited by examiner

*Primary Examiner* — Zachary K Huson
(74) *Attorney, Agent, or Firm* — Kowert, Hood, Munyon, Rankin & Goetzel, P.C.

(57) ABSTRACT

An apparatus and method for encoding data are disclosed that may allow for performing periodic calibration operations on a communication link. A controller may determine multiple possible values for a reference voltage used with the communication link based on an initial value. Calibration operations may be performed using each possible value, and the results of the operations scored based on the width of data eyes measured during the calibration operations. The controller may then select a new value for the reference voltage from the multiple possible values dependent upon the scores of each of the multiple possible values.

20 Claims, 10 Drawing Sheets

US 10,515,028 B2

REFERENCE VOLTAGE CALIBRATION USING A QUALIFIED WEIGHTED AVERAGE

The present application is a continuation of U.S. application Ser. No. 14/676,174, filed Apr. 1, 2015, the disclosure of which is incorporated by reference herein in its entirety.

BACKGROUND

Technical Field

Embodiments described herein are related to the field of high-speed interface design, and more particularly to AC coupling techniques.

Description of the Related Art

Computing systems typically include a number of interconnected integrated circuits. In some cases, the integrated circuits may communicate through parallel interfaces, which simultaneously communicate multiple bits of data. In other cases, the integrated circuits may employ a serial interface, which sequentially communicates one bit of data at a time. In some cases, both parallel and serial interfaces, individual bits of communicated data may be differentially encoded.

In a computing system, the integrated circuits may have different power supply requirements, which may result in different output voltages being coupled to the integrated circuits' respective communication ports. Furthermore, variations in the properties of wiring traces on circuit boards as well as differences in power supply performance, may further contribute to differences in the power supply voltages supplied to the integrated circuits.

Fluctuations in power supply voltage levels and temperature dependent changes to circuit characteristics may affect the quality of data transmitted from one integrated circuit to another. To ensure overall system performance, transceiver circuits may be adjusted dependent upon the aforementioned changes in power supply voltage and temperature. In some cases, a time at when a data bit is sample may be adjusted in an effort to center the sampling point within the valid region of the data bit.

SUMMARY OF THE EMBODIMENTS

Various embodiments of an apparatus to perform calibration operations on a communication link are disclosed. Broadly speaking, a system and method are contemplated in which a memory controller coupled to a memory via a communication link may be configured to select an initial value for a voltage reference for the communication link. The memory controller may be further configured to determine a plurality of possible values for the voltage reference, and perform a plurality of calibration operations. Each calibration operation may be dependent upon a respective possible value of the plurality of possible values. Upon completion of a given calibration operation, the memory controller may be further configured to determine a score for the respective possible value dependent upon a width of a data eye for at least one bit transferred during the given calibration operation. The memory controller may be further configured to select a new value for the reference voltage dependent upon the score for each possible value of the plurality of possible values.

In one embodiment, to select the new value for the voltage reference, the memory controller may be further configured to determine which possible value of the plurality of possible values has a largest score.

In another specific embodiment, the memory controller may be further configured to determine a weighted average of a subset of the plurality of possible values dependent upon the score of each possible value of the subset of the plurality of possible values in order to select the new value for the voltage reference.

BRIEF DESCRIPTION OF THE DRAWINGS

The following detailed description makes reference to the accompanying drawings, which are now briefly described.

Figure 1:
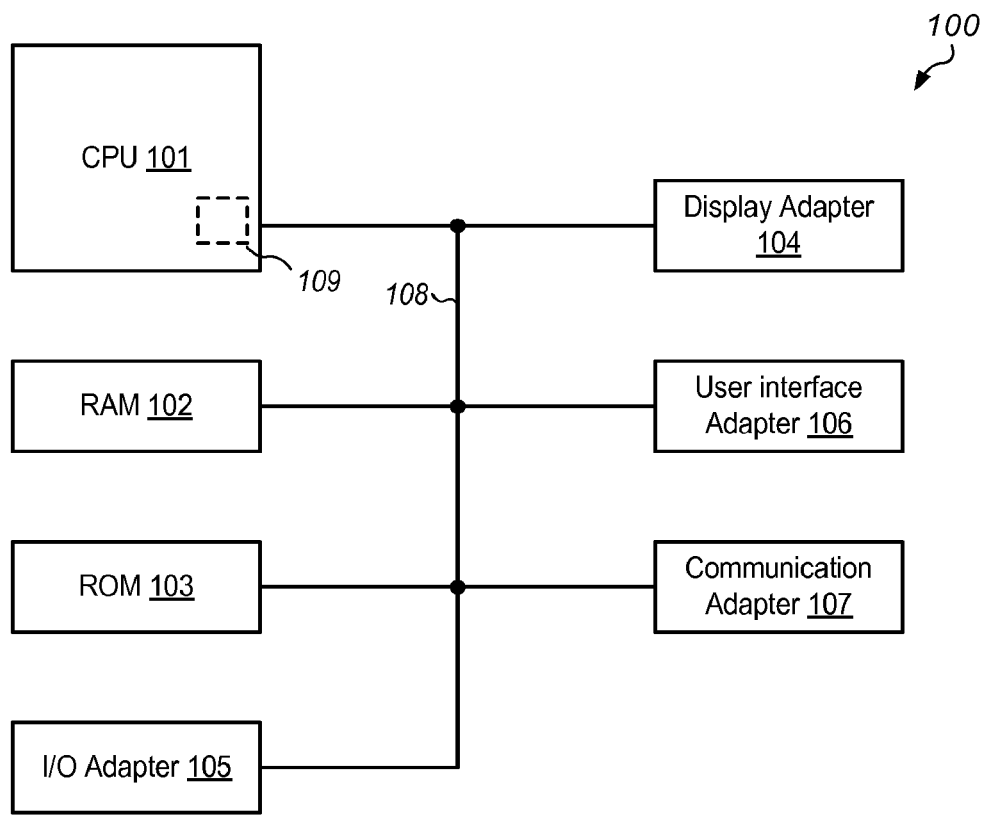
FIG. 1 illustrates an embodiment of a computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

A computing system may include one or more integrated circuits, such as, e.g., a central processing unit (CPU) and memories. Each one of the integrated circuits of the computing system may communicate through either a serial or parallel interface. In a parallel interface, multiple data bits are communicated simultaneously, while in a serial interface, data is communicated as a series of sequential single data bits. The data may be communicated in accordance to one of various communication protocols.

Data communicated between integrated circuits of the computing system may be transmitted over a collection of wires (also referred to herein as a "bus"). In order to change the logic state of a wire on the bus, charge may be applied to the wire, or charge may be removed, i.e., discharged from the wire. A receiving device may then sample the resultant changes in voltage level on the individual wires in order to reconstruct the transmitted data.

Changes to environmental and operational parameters may affect the quality of data transmitted on such busses. As a result, the bit error rate (BER) of a device receive data may increase. To mitigate such an increase in the BER, calibration or training of the circuit coupled to the busses (collectively a "communication link") may be performed. The embodiments illustrated in the drawings and described herein may provide techniques for calibrating a communication link thereby provide more reliable data transmission.

A block diagram of a computing system is illustrated in FIG. 1. In the illustrated embodiment, the computing system 100 includes a CPU 101 coupled to Random Access Memory (RAM) 102, Read-only Memory (ROM) 103, and display adapter 104. CPU 101 is additionally coupled to input/output (I/O) adapter 105, user interface adapter 106, and communications adapter 107. In various embodiments, computing system 100 may be configured as a desktop system, a laptop system, or in any suitable form factor.

RAM 102 may include any suitable type of memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. It is noted that although one RAM is shown, in various embodiments, any suitable number of RAMs may be employed.

CPU 101 may implement any suitable instruction set architecture (ISA), such as, e.g., the SPARC™, PowerPC™, or x86 ISAs, or combination thereof. In some embodiments, CPU 101 may include one or more processor cores configured to implement one of the aforementioned ISAs.

CPU 101 may include one or more bus transceiver units 109 that allow CPU 101 to connect to bus 108. In some embodiments, bus 108 may be a high-speed serial interface that may conform to an industry standard specification, such as, e.g., PCI Express™, or MIPI Physical Layer.

ROM 103 may be configured to store instructions to be executed by CPU 101. In some embodiments, ROM 103 may store instructions necessary for initial boot-up and configuration of CPU 101. The stored instructions may include, in some embodiments, instructions to perform a power-on self-test that may allow CPU 101 to test embedded cache memories and other circuit blocks that may reside on CPU 101 as well as instructions for initial setup of CPU 101. In some embodiments, ROM 103 may be mask-programmable using a metal, polysilicon, contact, implant, or any suitable mask layer available on a semiconductor manufacturing process. Although a ROM is depicted in the embodiment illustrated in FIG. 1, in other embodiments, any suitable non-volatile memory, such as, e.g., flash memory, may be employed.

I/O adapter 105 may be configured to coordinate data transfer between CPU 101 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O adapter 105 may be configured to implement a version of Universal Serial Bus (USB) protocol or IEEE 1394 (Firewire®) protocol.

Communication adapter 107 may be configured to coordinate data transfer between CPU 101 and one or more devices (e.g., other computer systems) coupled to CPU 101 via a network. In one embodiment, communication adapter 107 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, communication adapter 107 may be configured to implement multiple discrete network interface ports.

User interface adapter 106 may be configured to transfer data between one or more peripheral devices configured to input data into computing system 100. In one embodiment, user interface adapter 106 may receive input from a keyboard and transfer the data to CPU 101. In other embodiments, user interface adapter 106 may receive and format data from a mouse or other suitable pointing device.

Display adapter 104 may be configured to transfer and format data from between CPU 101 and a display screen. In some embodiments, display adapter 104 may be configured to implement a display standard such as Super-VGA or High-Definition Multimedia Interface (HDMI). In other embodiments, display adapter 104 may be configured to implement multiple display interfaces.

The embodiment illustrated in FIG. 1 is merely an example. In other embodiments, different types and numbers of devices are possible and contemplated.

Figure 2:
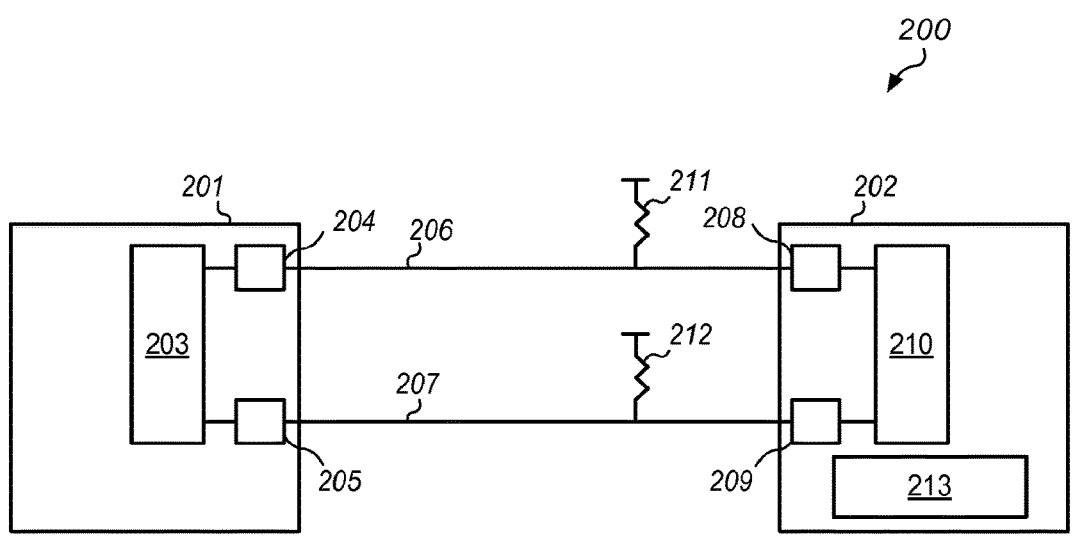
FIG. 2 illustrates another embodiment of a communication link between components of a computing system.

Turning to FIG. 2, another embodiment of communication link coupling devices in a computing system. In the illustrated embodiments, computing system 200 includes device 201 coupled bus 206 and bus 207, which are, in turn, coupled to device 202. Termination devices 211 and 212 are coupled to bus 206 and 207, respectively. In various embodiments, devices 201 and 202 may correspond to any of the functional blocks described above in referenced to computing system 100 as illustrated in FIG. 1.

Bus 206 and bus 207 may, in various embodiments, include multiple conductive traces on a circuit board, substrate, or any other material suitable for the implementation of a computing system, such as computing system 200, for example. In some embodiments, traces at a constant electrical potential may be inserted between the individual traces included in bus 206 and bus 207. Such traces (commonly referred to as "shields") may, in various embodiments, reduce capacitive and inductive coupling between the individual traces of bus 206 and bus 207, thereby improving the integrity of the signals transmitted on busses 206 and 207.

Device 201 includes circuit 203, which is coupled to transmit circuits 204 and 205, which are, in turn, coupled to bus 206 and bus 207, respectively. In some embodiments, circuit 203 may be configured to encode data to be transmitted to device 202 via bus 206 and bus 207. The data may be encoded by one of various encoding methods such as, e.g., bit inversion, or any other suitable encoding method. In some embodiments, circuit 203 may generate test data used during calibration operations used to adjust how the data is received at device 202. The test data may be determined according to a predetermined algorithm to ensure sufficient transitions on busses 206 and 207 for the calibration operations.

Circuit 203 may also generate an error correction code for the data. The error correction code may be generated prior to encoding, or may be generated using the encoded data, and may include a Cyclic Redundancy Check (CRC) or any other suitable error checking code. Circuit 203 may be designed in accordance with one of numerous design styles. For example, circuit 203 may be a general-purpose processor executing program instructions stored in a memory, a dedicated logic circuit, a memory circuit configured to perform as a look-up table, or any other suitable circuit configured to encode data.

Transmit circuits 204 and 205 may be configured to translate voltage levels of the encoded data for transmission on bus 206 and bus 207, respectively. For example, transmit circuit 204 and 205 may each be configured to transmit data in accordance with the Low-Voltage Transistor-Transistor Logic (LVTTL) standard, or any other suitable voltage levels suitable for signaling from one device to another.

Termination devices 211 and 212 may, in various embodiments, be configured to match the impedance of bus 206 and 207 to the input impedance of receive circuits 208 and 209, respectively. It is noted that although termination devices 211 and 212 are depicted as resistors coupled to a power supply, in other embodiments, termination devices 211 and 212 may include resistors coupled to ground, combinations of resistors, capacitors, and inductors, or any other suitable collection of active or passive circuits elements capable of matching the aforementioned impedances.

Device 202 includes receive circuits 208 and 209 which are coupled to bus 206 and 207, respectively. Receive circuits 208 and 209 are further coupled to decoder 210. Receive circuit 208 and 209 may be configured to translate voltage levels on bus 206 and bus 207, respectively, to a voltage levels used by decoder 210. For example, receive circuits 208 and 209 may translate LVTTL voltage levels to Complementary Metal-Oxide Semiconductor (CMOS) voltage levels. In some embodiments, receive circuits 208 and 209 may employ a reference voltage in order to determine a logical state of a given data bit transmitted on busses 206 and 207. Voltage levels sampled on busses 206 and 207 above the reference voltage may correspond to one logic state, and voltage levels below the reference voltage may correspond to a different logic state.

Device 202 also includes clock circuit 213. In various embodiments, clock circuit 213 may include a phase-locked loop (PLL), delay-locked loop (DLL), or other suitable circuit used to generate a clock signal used by receive circuits 208 and 209 for sampling data transmitted on busses 206 and 207.

Circuit 210 may be configured to decode the encoded data received by receive circuits 208 and 209, thereby translating the received encoded data into a format that may be used by device 202. Circuit 210 may also analyze an error checking code such as, e.g., a CRC code, generated by encoder 203, to determine if errors were introduced during the transmission of the data via busses 206 and 207. In some embodiments, circuit 210 may signal to other logic circuits (not shown) within device 202 that the received data contains errors. Circuit 210 may, in other embodiments, attempt to correct the errors in cases where a sending device includes an Error Correction Code (ECC).

As described below in more detail, circuit 210 may be configured to determine a width of a data eye during a calibration operation. Circuit 210 may also track widths of multiple data eyes, each of which is associated with a different reference voltage level supplied to receive circuits 208 and 209. In various embodiments, circuit 210 may used the data eye widths to select a reference voltage level that results in a least number of transmission errors on busses 206 and 207. Circuit 210 also may adjust one or more settings associated with clock circuit 213.

In some embodiments, circuit 210 may be designed in accordance with one of numerous design styles. For example, circuit 210 may be a general-purpose processor executing instructions stored in a memory, dedicated logic circuit, a memory device configured to perform as a look-up table, or any other suitable circuit for decoding the received encoded data.

It is noted that the embodiment of a computing system illustrated in FIG. 2 is merely an example. In other embodiments, different numbers of busses coupling different numbers of devices may be employed.

Figure 3:
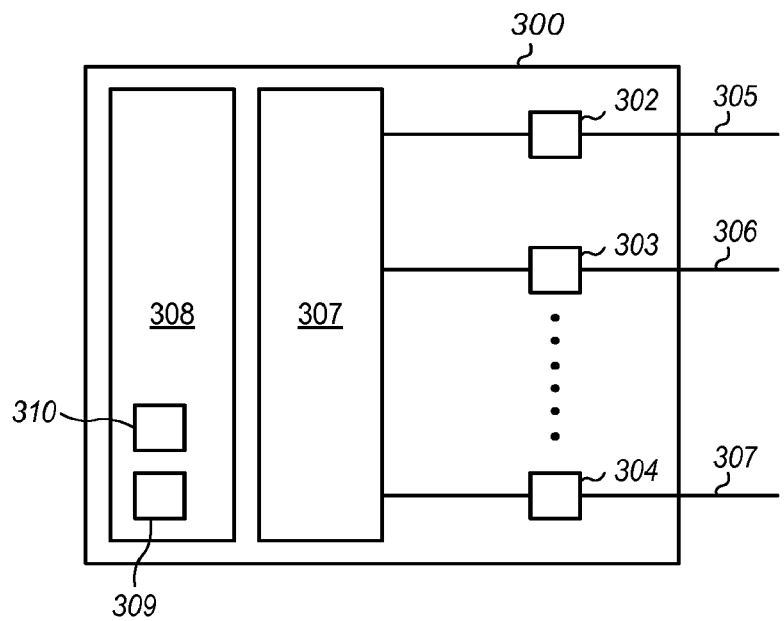
FIG. 3 illustrates an embodiment of a portion of an integrated circuit.

An embodiment of integrated is illustrated in FIG. 3. In various embodiments, integrated circuit 301 may correspond to either of device 201 or device 202 as illustrated in FIG. 2. In the illustrated embodiment, integrated circuit 300 includes receiver units 302 through 304 coupled to busses 305 through 307, respectively. Integrated circuit 300 further includes logic unit 307 and control unit 308.

Logic unit 307 is coupled to receiver units 302 through 304 and may perform one of various functions. For example, logic unit 307 may be a general-purpose processor configured 307 may be a memory or a dedicated state-machine logic circuit. Logic unit 307 may, in various embodiments, perform decoding of data received off-chip via busses 305 through 307.

During operation, integrated circuit may request a calibration operation be performed. In that case, as described below in regard to FIG. 5, a series of test data bits may be transmitted to integrated circuit 301 via busses 305 through 307. Each of receiver units may sample the test data bits based on a sampling clock generated by a DLL or other suitable circuit (not shown) and a reference voltage. Additional sampling may be performed on each test data bit on order to determine a period of time a given data bit is valid (commonly referred to as a "passing window" or "data eye width").

Control unit 308 may, in some embodiments, use the width of the various data eyes to determine an alternative value for the reference voltage in order to improve the detection of the data on busses 305 through 307. As described below in more detail, control unit 308 may used multiple possible reference voltage (Vref) values and score the results of obtained using each possible value. Using the scored values, control unit 308 may perform a weighted average of qualified reference voltage values in order to determine a new reference voltage value.

In some embodiments, control unit 308 may initiate calibration operations. As described below in more detail, a value of a counter or other timing circuit may be used to determine when to initiate a calibration operation. Alternatively, or additionally, control unit 308 may initiate calibration operation s in response to change in the operating frequency of the data busses. In some embodiments, operating system software may determine that additional performance is desirable, and increase the frequency of the data busses. In other embodiments, the operating system software may decrease the frequency of the data busses to reduce power consumption when performance demands are less.

Control unit 308 may be designed in accordance with one of various design styles. For example, control unit 308 may be a general-purpose processor executing program instructions stored in a memory. Alternatively, control unit 308 may a dedicated logic circuit or state machine. Control unit 308 includes counter 309 and registers 310. In various embodiments, counter 309 may be a sequential logic circuit used to track elapsed time or an amount of data sent. The value of counter 309 may be used to determine, in some embodiments, when to initiate calibration operations. Various settings and programmable values used during the calibration process may be stored in registers 310 which may, in various embodiments, be implemented as multiple latches, flip-flops, or other suitable storage circuit. Counter 309 may be free running and not subject to power gating. In some embodiments, the calibration operations may be initiated even when portions of a device, such as, device 201 as depicted in FIG. 2, are clock or powered gated to reduce power consumption.

It is noted that the embodiment illustrated in FIG. 3 is merely an example. In other embodiments, different numbers of output drivers and different parasitic circuit elements may be possible.

Figure 4:
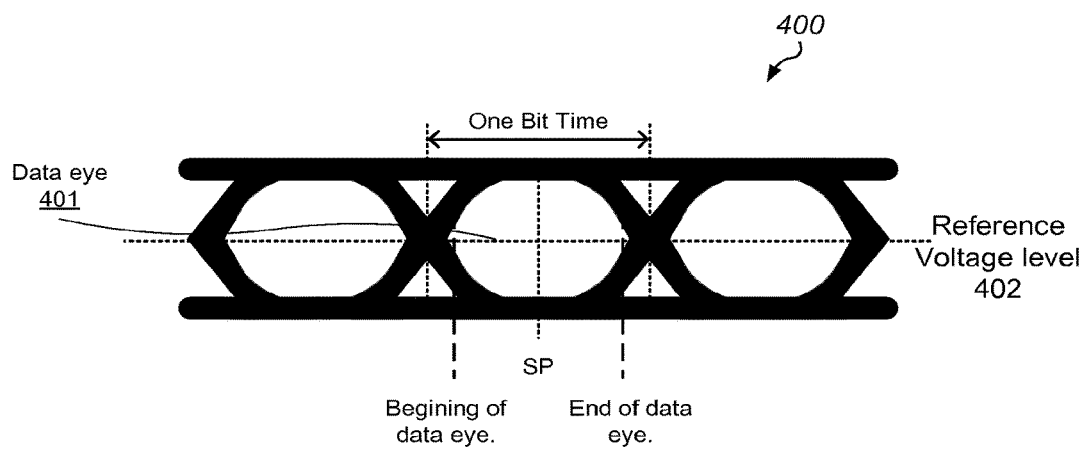
FIG. 4 illustrates an example of a data eye.

A representation of a timing diagram of a data eye from serialized data transmissions is illustrated in FIG. 4. Timing diagram 400 represents the voltage of the data lines over time for a sequence of data bits as received by a given device such as, e.g., device 202 in FIG. 2. The thickness of the black lines illustrates the range of the voltage of the data lines, such as would be used in busses 206 and 207, due to various factors that may couple noise into the lines or create jitter from bit-to-bit over time. In the present embodiment, a data stream is illustrated with a large well-defined data eye 401, i.e., the white space in the middle. Generally speaking, the larger and more well-defined a data eye is, the lower the bit error rate (BER) and more reliable the communications may be. In this example, the space from the beginning of data eye 401 to the end of data eye 401 is large compared to the overall bit time, providing a large window for a receiver circuit to properly capture the transmitted data.

In addition the voltage levels of the data lines, a reference voltage level 402 is also indicated. In various embodiments, voltage levels on the data lines exceeding reference voltage 402 may interpreted as one logic state, such as, a logic 1, for example. Alternatively, voltage levels on the data lines less than reference voltage level 402 may be interpreted as another logic state, such as, a logic 0, for example. By adjusting the sampling location within the data eye, separately, or in conjunction with the level of the reference voltage, the probability of successfully detecting a correct value for a given data bit may be improved. In various embodiments, test data may be sent between devices to allow for such adjustment. The process of making adjustments based on test data is commonly referred to as "training" or "calibration."

It is noted that the embodiment of the timing diagram illustrated in FIG. 4 is merely an example. In other embodiments, different shapes and widths of a data eye are possible and contemplated.

Figure 5:
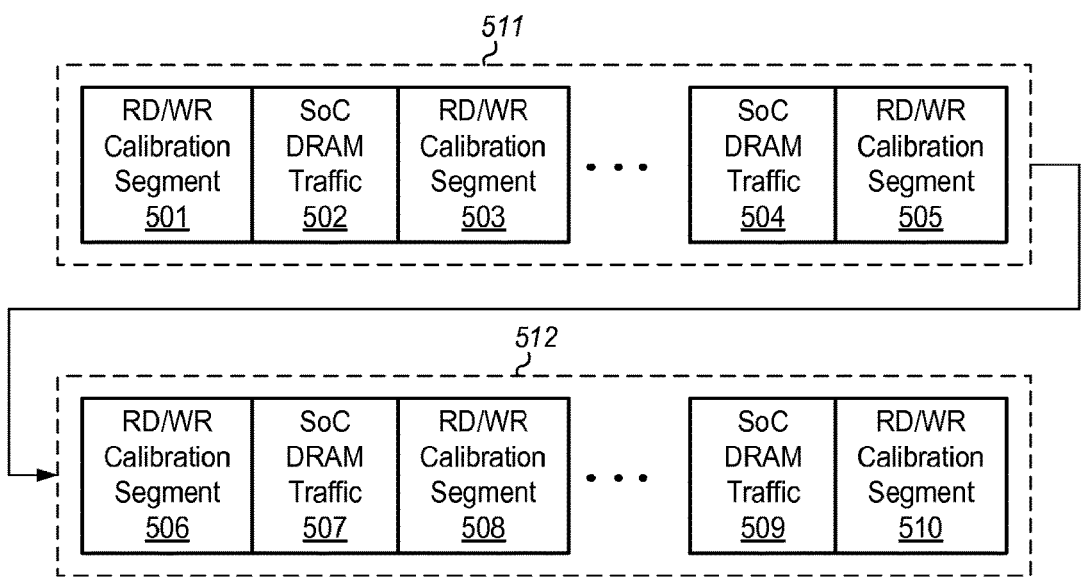
FIG. 5 illustrates a block diagram depicting an embodiment of a method for performing a Read/Write (RD/WR) calibration using multiple calibration points.

Turning to FIG. 5, a block diagram illustrating performing a calibration operation using multiple calibration points is depicted. As previously described, a calibration operation may include calibration at multiple voltage reference levels. Depending on the number voltage reference levels employed, the available bandwidth for transmitting non-calibration related data on the communication link may be reduced. To mitigate such a problem, the calibration data may be broken in to separate segments within a given calibration point (i.e., reference voltage level).

Data 511 is initially exchanged between devices, such as, e.g., devices 201 and 202 as illustrated in FIG. 2. In various embodiments, data 511 includes both non-calibration and calibration related data. As data 511 is exchanged between the devices, RD/WR calibration segment 501 is initially transmitted, followed by SoC DRAM traffic 502. This process repeats until the final calibration segment, RD/WR calibration segment 505 is transmitted after SoC DRAM traffic 504. In various embodiments, each segment, such as, e.g., RD/WR calibration segment 501, may include the repeated transmission from one device to another of one or more test data bits. Individual test data bits or sequences of test data bits may be repeatedly transmitted in order to gather characteristic information of a particular data eye.

In a similar fashion, data 512 is exchanged between the devices. In this case, the calibration data included in data 512, specifically RD/WR calibration segments 506, 508 and 510, include various data bits to be sensed using a second reference voltage level. The process may continue with additional data blocks until data has been gathered with all desired reference voltage levels. By interspersing calibration data bits (i.e., segments) with normal data traffic, an effect of the calibration operation on the available bandwidth of the communication link may be minimized.

Although only two data blocks, data 511 and data 512, are depicted in the embodiment illustrated in FIG. 5, in other embodiments, any suitable number of data blocks may be employed.

Figure 6:
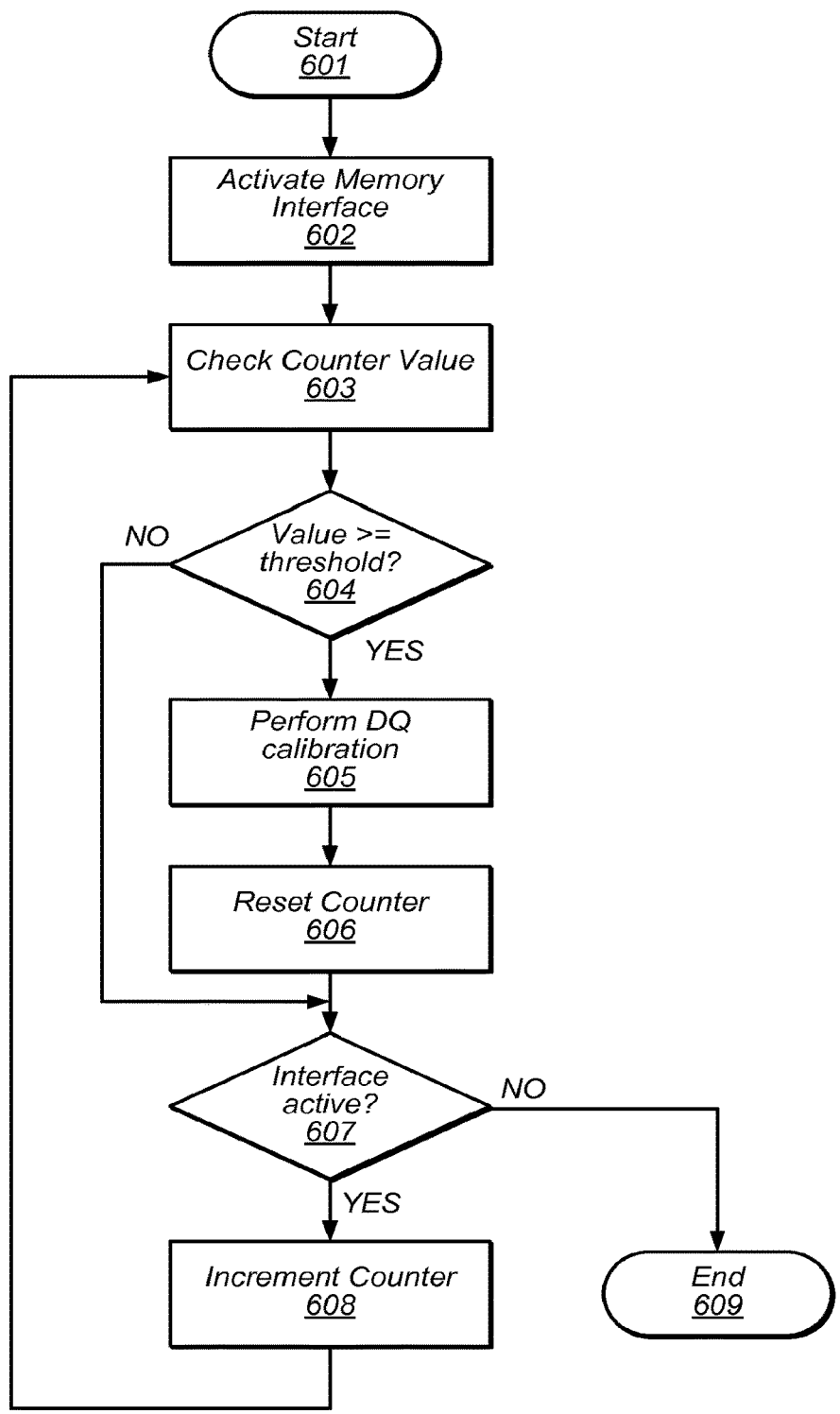
FIG. 6 depicts a flow diagram illustrating an embodiment of a method for performing periodic calibrations for a communication link.

Turning to FIG. 6, a flow diagram illustrating an embodiment of a method for performing periodic calibration operations for a communication link is depicted. Referring collectively to FIG. 3 and the flow diagram of FIG. 6, the method may begin in block 601. A specific type of communication link, a memory interface, may then be enabled (block 602). In various embodiments, the memory interface may be enabled in response to a system startup, or the system returning from a sleep or power down mode.

A value of counter 309 may then be checked (block 603). In some embodiments, an output of counter 309 may be compared against a predetermined or programmable value using a comparator or other suitable logic circuit. The method may then depend on the value of counter 309 (block 604).

If the value of counter 309 is less than the predetermined or programmable threshold value, then the method may depend on if the memory interface is still active (block 607). If the memory interface is no longer active, or has been schedule to be disabled or shut down, the method may end in clock 509. Alternatively, if the memory interface is still active, counter 309 may still be incremented (block 608) and the method may proceed from block 603 as described above. In various embodiments, the counter may be incremented in response to a particular period of time elapsing, or an amount of data being transmitted on the memory interface.

Returning to block 604, if the value of the counter is greater than or equal to the predetermined or programmable threshold value, then a DQ calibration operation may be performed (block 605). In some embodiments, the DQ calibration operation may include a Vref calibration dependent upon the status of control bits stored in registers 310. The data used during the DQ calibration operation may be interspersed with normal data traffic on the memory interface to limit an impact on system performance. Once the DQ calibration has completed, counter 309 may then be reset (block 607). The method may then proceed from block 607 as described above.

It is noted that the embodiment of the method illustrated in FIG. 6 is merely an example. In other embodiments, different operations and different orders of operations are possible and contemplated.

Figure 7:
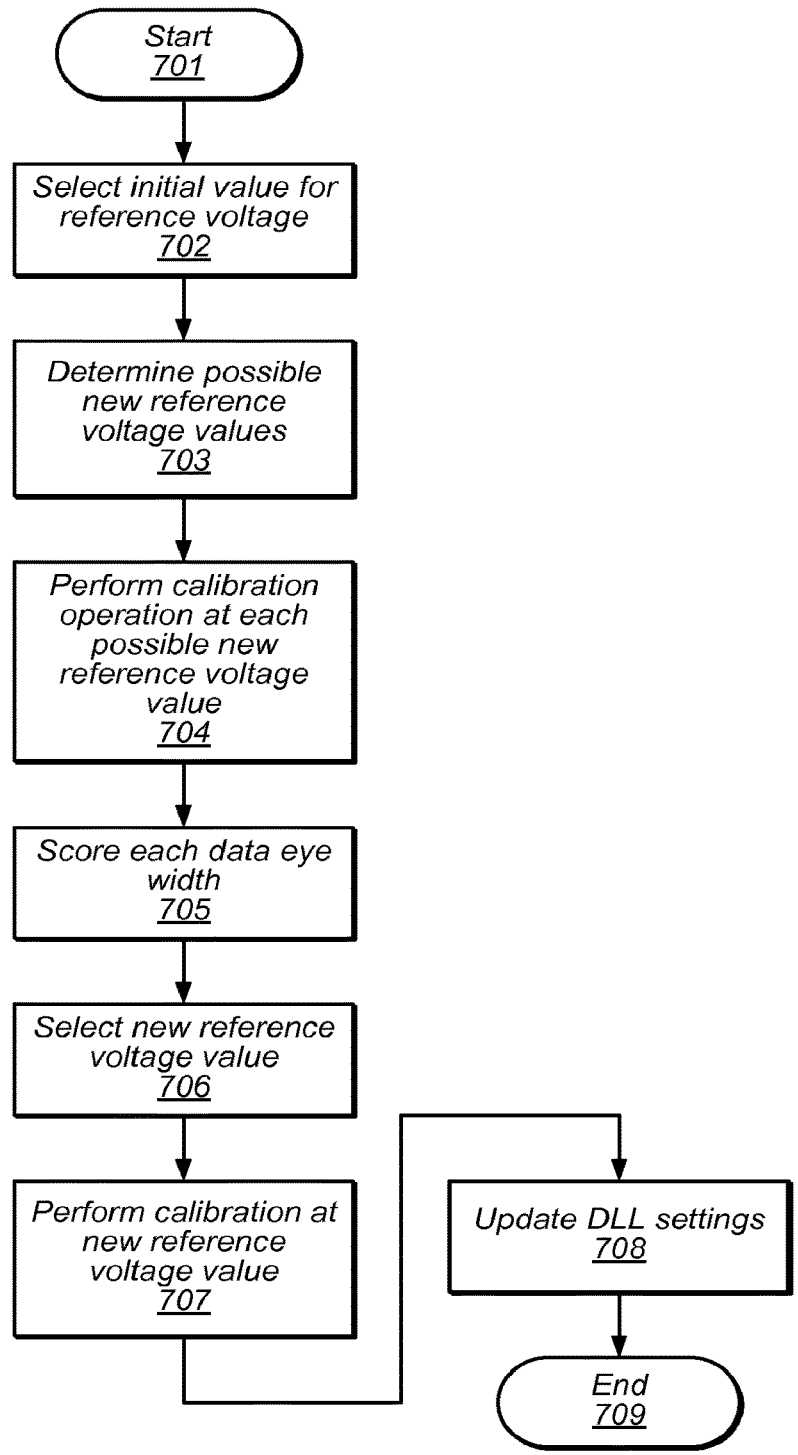
FIG. 7 depicts a flow diagram illustrating an embodiment of a method for performing a voltage reference calibration for a communication link.

A flow diagram depicting an embodiment of a method for performing a voltage reference calibration for a communication link is illustrated in FIG. 7. Referring collectively to FIG. 3 and the flow diagram of FIG. 7, the method begins in block 701. Control unit 308 then selects an initial reference voltage level (block 702). In some embodiments, the initial level may be programmable or may be selected based on environmental conditions, such as, e.g., temperature or supply voltage.

Control unit 308 may then determine new possible values for the reference voltage (block 703). In some embodiments, adding or subtracting a predetermined or programmable offset from the initial reference voltage value may generate the new possible values. The number of new possible may values may be also be a programmable value. In other embodiments, a predetermined set of new possible values may be used. Such values may be stored in a register or other suitable memory location.

A calibration operation is then performed using each of the new possible reference voltage values (block 704). In some embodiments, test data bits associated with each possible voltage reference value are interspersed with normal data traffic on busses 305 through 307 to limit the impact of the calibration operation on system bandwidth.

In conjunction with receiver circuits 302 through 304, control unit 308 may determine a width for a data eye associated with a given possible value for the reference voltage and score each data eye width (block 705). In various embodiments, multiple samples are taken while receiving a given data bit. Since the values of the test data is available to control unit 308, the individual samples of a given data bit using a particular possible reference voltage value may be compared to the actual data value. Using the comparison, the width of the data eye may be determined. In some embodiments, the score may be the size of the passing window of the test data. The test data may include multiple data bits, such as, e.g., 18-bits, and the score may be the worst, i.e., smallest passing window measured for each of the multiple data bits. In other embodiments, the score may be an average passing window size of the multiple data bits.

Using the scores associated with each of the new possible values, control unit 308 may select a new value for the reference voltage. As described below in regard to FIG. 9 and FIG. 10, different methods may be employed to select the new value. Once a new reference voltage value is selected, another calibration operation is performed (block 707). In some embodiment, this particular calibration operation may employ different timing for sampling test data. The data eye may be scanned, and a passing window may be determined based on the results of the scan. DLL settings are then updated based on the determined passing window (block 708). The method may then conclude in block 709.

Although the operations in flow diagram illustrated in FIG. 7 are depicted as being performed in a serial fashion, in other embodiments, one or more of the operations may be performed in parallel.

Figure 8:
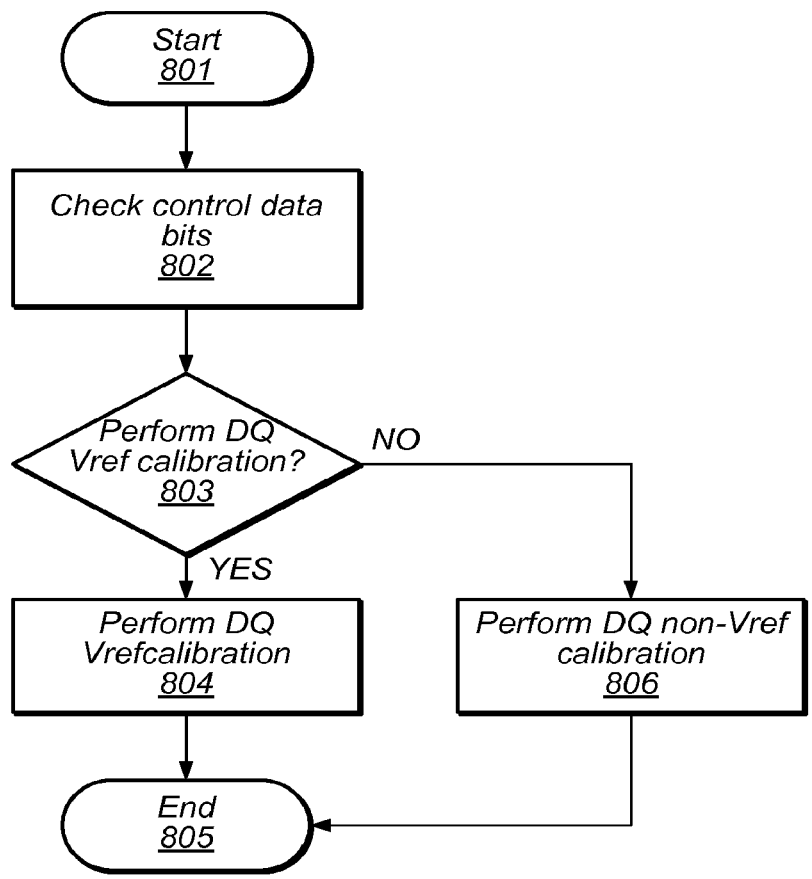
FIG. 8 depicts a flow diagram illustrating an embodiment of a method for determining a type of calibration to be performed for a communication link.

Turning to FIG. 8, a flow diagram depicting an embodiment of a method for determining a type of calibration to be performed for a communication link is illustrated. In some embodiments, the method depicted in the flow diagram of FIG. 8, may correspond to operation of block 605 as illustrated in FIG. 6. Referring collectively to FIG. 3, and the flow diagram of FIG. 8, the method begins in bock 801.

Control unit 308 may then read control data bits from registers 310 (block 802). The method may then depend on the value of the control data bits (block 803). If the control data bits indicate a Vref calibration is to be performed, then a DQ Vref calibration operation is initiated (block 804). In various embodiments, the DQ Vref operation of block 804 may correspond to the method illustrated in the flow diagram of FIG. 7. With the completion of the DQ Vref calibration operation, the method may conclude in block 805.

If, however, the control data bits indicate that a Vref calibration is not needed, then a DQ non-Vref calibration is initiated (block 806). In such a calibration, the reference voltage level is left unchanged, and timing adjustments are made to the sampling clock by modifying operating parameters of a DLL or other suitable clock generation circuit. With the completion of the DQ non-Vref calibration operation, the method concludes in block 805.

It is noted that the embodiment illustrated in FIG. 8 is merely an example. In other embodiments, different operations and different orders of operations are possible and contemplated.

Figure 9:
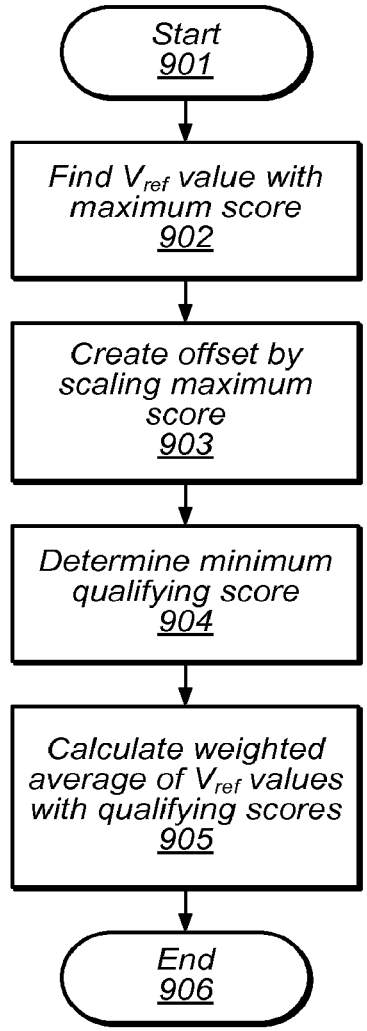
FIG. 9 depicts a flow diagram illustrating an embodiment of a method for determining a value of a reference voltage for a communication link using a qualified weighted average.

Turning to FIG. 9, a flow diagram depicting an embodiment of a method for determining a new reference voltage level is illustrated. In some embodiments, the method depicted in the flow diagram of FIG. 9 may correspond to the operation indicated by block 706 of the flow diagram illustrated in FIG. 7. Referring collectively to FIG. 3, and the flow diagram of FIG. 3, the method begins in block 901.

Control unit 308 then determines the possible Vref value with the maximum score (block 902). After the maximum score has been determined, control unit 308 then creates an offset (block 903). The offset may be generated, in various embodiments, by multiplying a programmable scale factor by a DLL parameter. It is noted that, in other embodiments, any suitable offset generation method may be employed.

Control unit 308 then determines a minimum qualifying Vref score and using the minimum qualifying Vref score, determines which Vref points are to be included in subsequent calculations (block 904). In various embodiments, the minimum qualifying Vref score may be determined by subtracting the previously determined offset offset from the maximum Vref score. Vref points whose score is greater than or equal to minimum qualifying Vref score are then used in a weighted average calculation.

A weighted average of the qualifying Vref points may then be calculated to determine a new value for the reference voltage (block 905). As depicted in equation 1, the new value is the quotient of the sum of the product of each qualifying Vref point and its associated score, and the sum of qualifying Vref points' scores. It is noted that in other embodiments, different equations and different weighting schemes may be employed. Once the new value has been computed, the method may conclude in block 906.

$$Vref_{new} = \frac{\Sigma_{qualified\ Vref\ points}(Vrefpoint \times Vrefscore)}{\Sigma_{qualified\ Vref\ points}(Vrefscore)} \quad (1)$$

Although the operations included in the embodiment of the method illustrated in the flow diagram of FIG. 9 are depicted as being performed in a serial fashion, in other embodiments, one or more of the operations may be performed in parallel.

Figure 10:
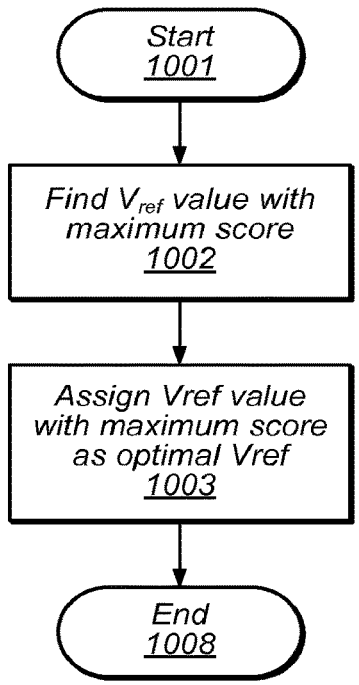
FIG. 10 depicts a flow diagram illustrating an embodiment of another method for determining a value of a reference voltage for a communication link.

Turning to FIG. 10, a flow diagram depicting another embodiment determining a reference voltage level used with a communication link. In some embodiments, the method depicted in the flow diagram of FIG. 10 may correspond to the operation indicated by block 706 of the flow diagram illustrated in FIG. 7. Referring collectively to FIG. 3, and the flow diagram of FIG. 10, the method begins in block 1001.

Control unit 308 may then examine score of each of the possible new values for the reference voltage to determine which of the possible new values has the largest score (block 1002). Once the possible value with the maximum score has been determined, control unit 308 then assigns the possible value as a new value for the reference voltage (block 1003). The method may then conclude in block 1004.

It is noted that the embodiment illustrated in FIG. 10 is merely an example. In other embodiments, different operations and different orders of operations may be employed.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
a memory circuit; and
a memory controller circuit coupled to the memory circuit via a communication link, wherein the memory controller circuit is configured to:
during data transfer and in response to a determination that a particular quantity of data has been transmitted via the communication link:
select, based on one or more control bits, a particular calibration operation of a plurality of calibration operations; and
perform the particular calibration operation on the communication link.

2. The system of claim 1, wherein the particular calibration operation includes a voltage reference calibration.

3. The system of claim 2, wherein to perform the particular calibration operation on the communication link, the memory controller circuit is further configured to:
select an initial value for a voltage reference for the communication link;
determine a plurality of possible values for the voltage reference based on the initial value; and
perform a plurality of sub-operations, wherein each sub-operation uses a respective possible value of the plurality of possible values for the voltage reference.

4. The system of claim 1, wherein the memory controller circuit is further configured compare a value of a counter circuit and a threshold value.

5. The system of claim 4, wherein the memory controller circuit is further configured to increment the counter circuit in response to a completion of the particular calibration operation.

6. The system of claim 1, wherein the memory controller circuit is further configured to determine that the particular calibration operation of the of the plurality of calibration operations is to be performed based on a detection of a change in an operating frequency of the communication link.

7. A method, comprising:
determining a time to calibrate a communication link that is coupled between a first device and a second device using a quantity of data transmitted via the communication link during data transfer;
selecting, based on one or more control bits, a particular calibration operation of a plurality of calibration operations; and
performing the particular calibration operation on the communication link.

8. The method of claim 7, wherein the particular calibration operation includes a voltage reference calibration.

9. The method of claim 8, wherein performing the particular calibration operation includes:
selecting an initial value for a voltage reference for the communication link;
determining a plurality of possible values for the voltage reference based on the initial value; and
performing a plurality of sub-operations, wherein a particular sub-operation uses a respective possible value of the plurality of possible values for the voltage reference.

10. The method of claim 9, further comprising determining a score for a particular possible value of the plurality of possible values for the voltage reference based on a width of a data eye for at least one data bit transferred during a particular sub-operation of the plurality of sub-operations that uses the particular possible value.

11. The method of claim 7, wherein determining the time to calibrate the communication link includes comparing a value of a counter circuit to a threshold value.

12. The method of claim 11, further comprising incrementing the counter circuit in response to completing the particular calibration operation.

13. The method of claim 7, wherein determining the time to calibrate the communication link includes detecting a change in an operating frequency of the communication link.

14. A system, comprising:
a first device; and a second device coupled to the first device via a communication link, wherein the second device is configured to:
during data transfer and in response to a determination that a particular quantity of data has been transmitted via the communication link:
select, based on one or more control bits, a particular calibration operation of a plurality of calibration operations; and
perform the particular calibration operation.

15. The system of claim 14, wherein the particular calibration operation includes a voltage reference calibration.

16. The system of claim 15, wherein to perform the particular calibration operation, the second device is further configured to:
select an initial value for a voltage reference for the communication link;
determine a plurality of possible values for the voltage reference based on the initial value; and
perform a plurality of sub-operations, wherein each sub-operation uses a respective possible value of the plurality of possible values for the voltage reference.

17. The system of claim 16, wherein the second device is further configured to determine a score for a particular possible value of the plurality of possible values for the voltage reference based on a width of a data eye for at least one data bit transferred during a particular sub-operation of the plurality of sub-operations that uses the particular possible value.

18. The system of claim 14, wherein the second device is further configured to perform the particular calibration operation of the plurality of calibration operations based on a result of a comparison of a value of a counter circuit to a threshold value.

19. The system of claim 18, wherein the second device is further configured to increment the counter circuit in response to completing the particular calibration operation.

20. The system of claim 14, wherein the second device is further configured to perform the particular calibration operation of the plurality of calibration operations based on a detection of a change in an operating frequency of the communication link.

* * * * *